March 14, 1944. A. A. SCHWARTZ 2,344,420
MACHINE TOOL
Filed May 9, 1941 5 Sheets-Sheet 1

INVENTOR
Arthur A. Schwartz
BY
Bean, Brooks, Buckley & Bean
ATTORNEYS

March 14, 1944. A. A. SCHWARTZ 2,344,420
MACHINE TOOL
Filed May 9, 1941 5 Sheets-Sheet 2
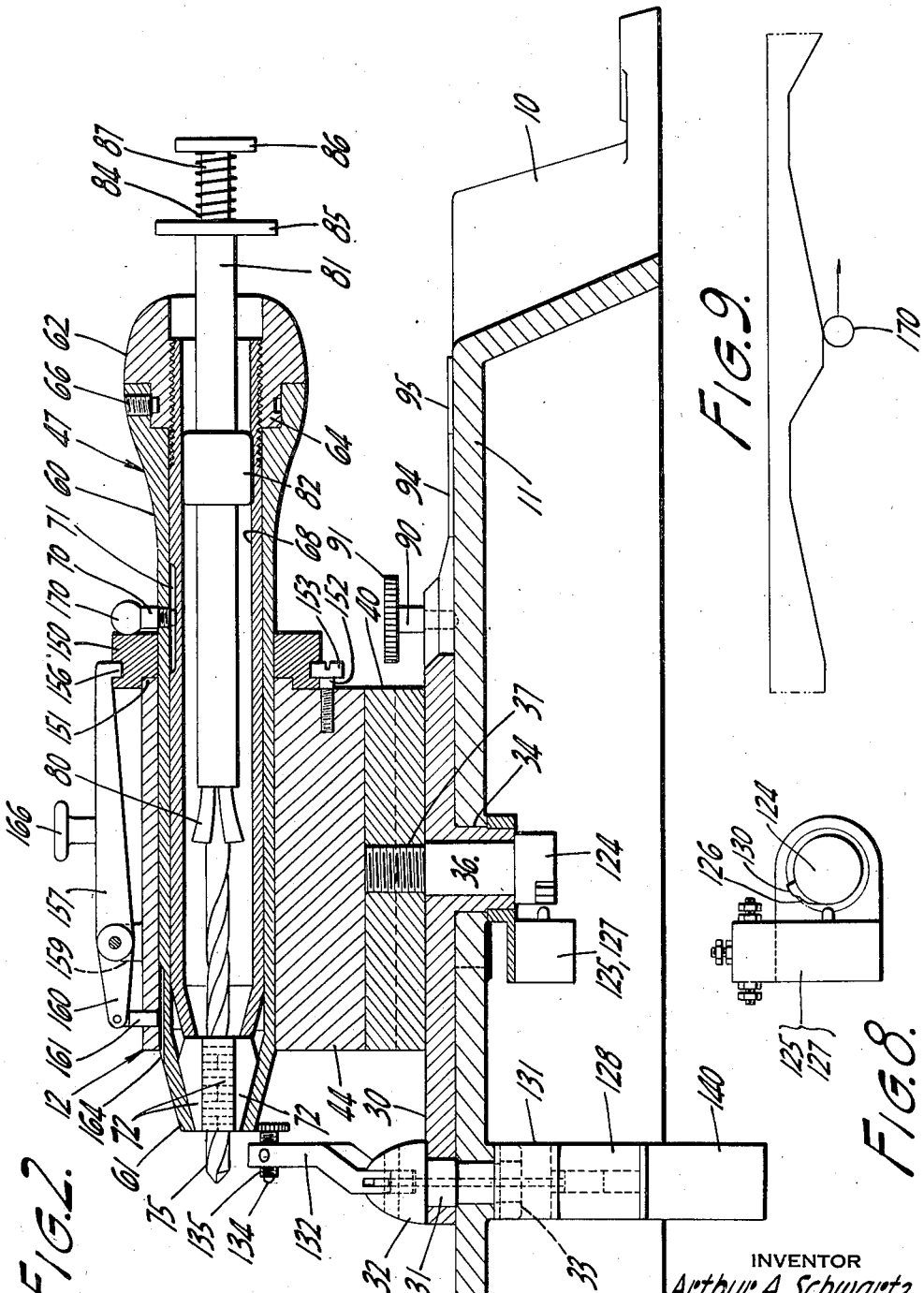
INVENTOR
Arthur A. Schwartz
BY
Beau, Brooks, Buckley & Beau.
ATTORNEYS March 14, 1944. A. A. SCHWARTZ 2,344,420
MACHINE TOOL
Filed May 9, 1941 5 Sheets-Sheet 3
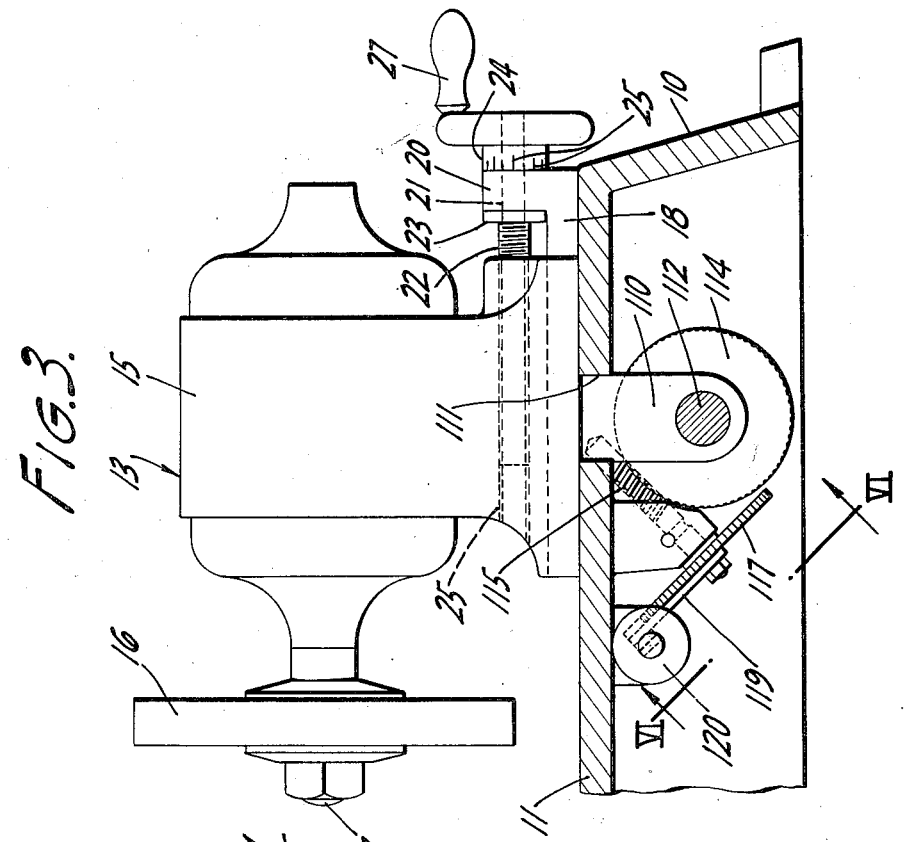
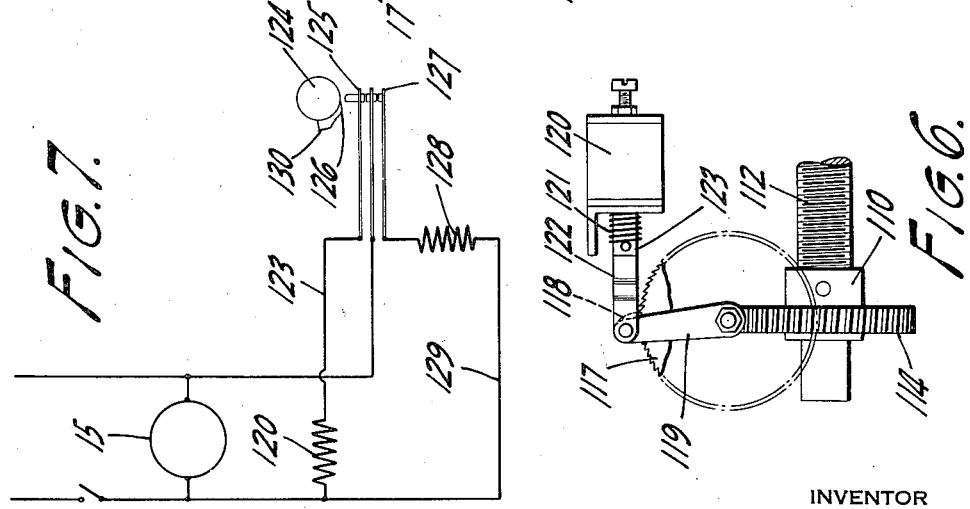
INVENTOR
Arthur A. Schwartz
BY
Beau, Brooks, Buckley & Beau.
ATTORNEYS

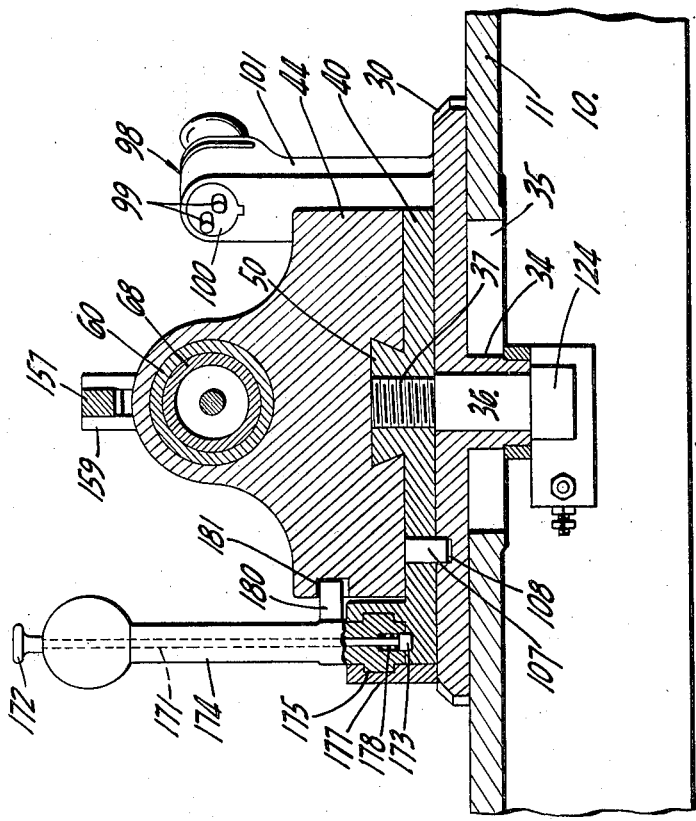
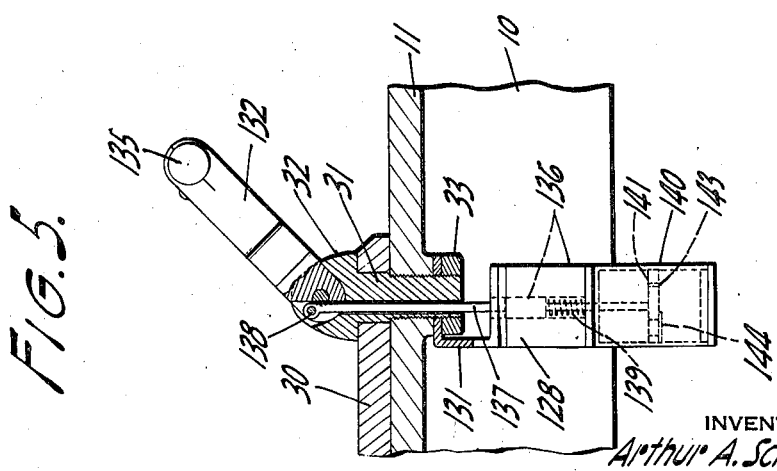

March 14, 1944.  A. A. SCHWARTZ  2,344,420
MACHINE TOOL
Filed May 9, 1941  5 Sheets-Sheet 5

INVENTOR
Arthur A. Schwartz
BY
Bean, Brooks, Buckley & Bean
ATTORNEYS

Patented Mar. 14, 1944

2,344,420

UNITED STATES PATENT OFFICE 2,344,420

MACHINE TOOL

Arthur A. Schwartz, Buffalo, N. Y., assignor to Bell Aircraft Corporation, Buffalo, N. Y.

Application May 9, 1941, Serial No. 392,713

3 Claims. (Cl. 51—219)

This invention relates to a novel counter-sinking bit and to novel apparatus and a novel method for producing the same; the novel machine of the invention being susceptible of employment in other analogous fabricating operations.

An object of the present invention resides in the provision of a novel counter-sinking bit wherein the cutting lip is presented to the work obliquely whereby the material is sheared from the object being operated upon.

A further object of the invention resides in the provision of a novel machine tool having a rotatable abrading or other material removing implement with means for presenting a work piece or blank thereto for formation of my novel counter-sinking bit. The novel method of presenting a bit blank to the material removing implement results in the accurate and facile formation of the desired cutting contour of my novel counter-sinking bit.

The novel machine of my invention may, without modification thereof other than by the quick substitution of interchangeable cams and chucking devices, be employed in originally grinding or regrinding the lip clearance of conventional twist drills of any form. The general ease and accuracy of operation of my novel machine in this latter capacity will be apparent to those skilled in the art from a consideration of the details of construction of the exemplary embodiment illustrated in the drawings and hereinafter described, together with the statements concerning the mode of operation included in the description.

While specific details of construction and operation are set forth in the following by way of example, it is to be understood that my invention is not to be considered as limited thereto or otherwise than as defined in the appended claims.

Fig. 2 is a vertical cross sectional view taken approximately on the line II—II of Fig. 1;

Fig. 3 is an elevational view of the grinding apparatus with the base of the machine shown fragmentarily in cross section;

Fig. 4 is a cross sectional view taken approximately on line IV—IV of Fig. 1;

Fig. 5 is a partial cross sectional view taken on the line V—V of Fig. 1 and showing means for dressing the grinding wheel and automatic means for operating the dressing means;

Fig. 6 is a detailed elevational view taken approximately as indicated by the line VI—VI of Fig. 3 showing means for feeding the grinding apparatus in a direction transverse to its axis of rotation for cooperation with the wheel dressing means;

Fig. 7 is a schematic view comprising a wiring diagram depicting the circuits provided for automatic operation of the grinding wheel dressing means and the transverse feed for the grinding apparatus;

Fig. 8 is a detailed view of a micro-switch for controlling the circuits of Fig. 7, together with an operating cam therefor;

Fig. 9 is a developed schematic view of the profile of a tool position-controlling cam;

Figure 1:
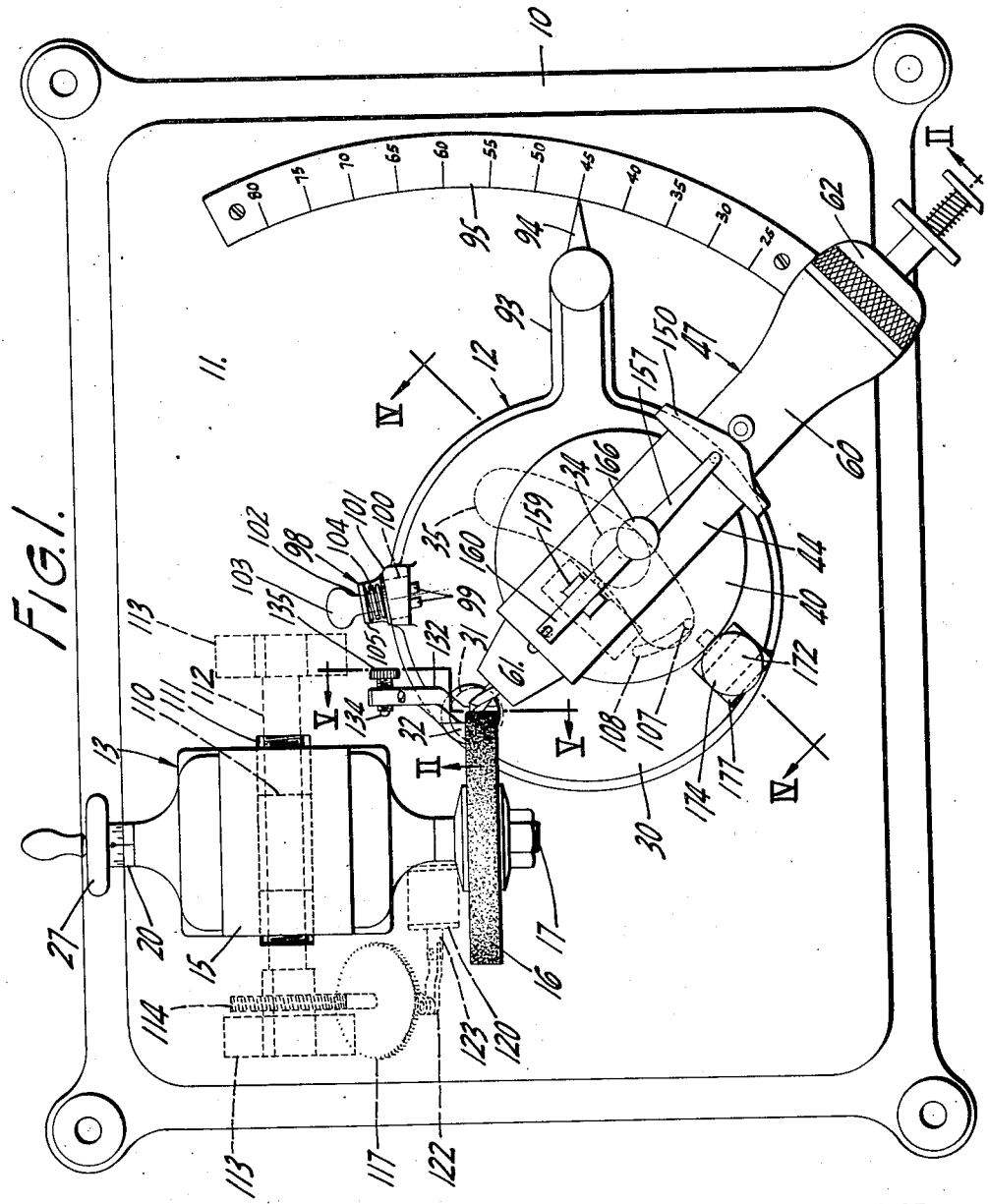
Fig. 1 is a general plan view of one form of the machine of my invention.

Throughout the several figures of the drawings like characters of reference denote like parts and the numeral 10 indicates generally a supporting base for the machine of my invention, such base having preferably a flat upper surface plate portion 11 for supporting a work piece holder designated generally 12 and a grinding apparatus designated generally 13 and arranged to operate upon the work piece.

The grinding apparatus comprises a driving motor 15 and a grinding wheel 16 having a peripheral grinding face and preferably disposed for rotation coaxially with the motor 15 as by being secured directly to a motor shaft 17 in conventional manner. The assembled motor 15 and wheel 16 may be adjustably moved on the surface plate portion 11 of the base 10 in the direction of the axis of the motor and wheel by the provision of an intermediate plate 18. The upper portion of the intermediate plate 18 and the base of the casing of the motor 15 are complementarily formed whereby the motor 15 may be moved axially along the plate 18 in guided relation.

Accurately adjusted position of the motor 15 along the plate 18 may be attained by providing an upstanding lug 20 on the plate 18 in which a journal portion 21 of a screw 22 may have bearing. Axial movement of the screw 21 with respect to the lug 20 may be prevented by the provision of collars 23 and 24 fixed to the screw, the latter conveniently serving to calibrate adjustment by virtue of graduations 25 provided thereabout. The threaded portion of the screw 22 engages a threaded opening 25 in the base of the casing of the motor 15 and this threaded engagement may be adjusted to move the motor axially by manipulation of a hand wheel 27 secured to the outer end of the screw 22.

The grinding wheel 16 and its driving motor 15 are further adapted to be moved along the base 10 in a direction at right angles to their joint axis of rotation to compensate for dressing of the grinding wheel. The instrumentalities provided for such transverse adjustment will be hereinafter described.

The work supporting means, designated generally 12, comprises essentially means for rigidly supporting a piece to be operated upon by the grinding wheel 16 or any other abrading element which may be substituted therefor. The piece to be operated upon may be in the nature of a twist drill, a countersinking bit, or any other analogous work piece requiring similar grinding treatment. It is desired to support the work piece in a readily releasable manner so that, while the axis of the drill bit or other work piece is maintained in a common horizontal plane with the axis of the grinding wheel, the work piece may be moved in various directions in a horizontal plane. Such movement is required for proper presentation of the drill bit or other work piece to the grinding wheel.

To this end the work supporting means 12 includes a bottom plate 30 which has a fixed pivot with respect to the base 10. This pivot may comprise a pin 31 extending through concentric apertures in the plate 30 and the upper surface plate 11 of the base 10. The pin 31, in the form illustrated, includes a head 32 and a threaded end provided with a nut 33 which cooperates to retain the plate 30 in assembled pivotal relation with respect to the base 10.

The plate 30 has, at a point spaced substantially from its pivot pin 31, a downwardly projecting, preferably circular, boss 34 which extends through an arcuate slot 35 formed in the upper surface plate 11 of the base 10. This boss 34 receives a journal portion of a pivot pin 36 which has a threaded end 37 for rigid assembly of the pivot pin 36 with respect to a plate 40 which is preferably circular and disposed upon the plate 30 for pivotal movement with respect thereto upon the axis of the pivot pin 36. The plate 40 in turn supports a mounting block 44 which has a horizontal, longitudinally extending opening for receiving any of a variety of drill bit or other work piece chucking means, one of which is designated generally 47 in Figs. 1 and 2.

The lower surface of the mounting block 44 and the upper surface of the circular plate 40 are complementarily grooved, as indicated at 50 in Fig. 4, whereby the former may be moved along the circular plate 40 in the direction of the axis of the chuck receiving opening in the mounting block 44. The means for releasably retaining the respective parts of the work piece holding means 12 in their variously adjusted positions will be alluded to presently.

The chucking means designated generally 47 comprises an outer shell or sleeve 60 which is rotatably disposed in the axial opening in the mounting block 44 and has a reduced tapered portion 61 at one end thereof, see Fig. 2. At its opposite end the sleeve 60 has associated therewith an annular knob 62 which may fit into a counterbored opening in the adjacent end of the sleeve 60, as at 64, for being rotatably supported thereby. The knob 62 has an annular groove 65 therein and the inner end of a screw 66 carried by the sleeve 60 engages such annular groove to prevent axial displacement of the knob 62 with respect to the sleeve 60 while at the same time permitting free rotative movement.

The knob 62 is interiorly threaded to cooperate with threads formed upon a sleeve 68 which is carried within the sleeve 60 for free axial movement with respect thereto. It will be noted that rotative movement of the knob 62 causes axial sliding movement of the sleeve 68 in the sleeve 60, relative rotation of the former with respect to the latter being prevented by engagement of the inner end of a screw 70 in an axially extending groove 71 formed in the sleeve 68. The screw 70 is threaded into the wall of the sleeve 60.

By moving the sleeve 68 axially to the left as viewed in Fig. 2, by manipulation of the knob 62, the left-hand end of the sleeve 68 may be brought to bear against a plurality of segmentally arranged chuck jaws 72 which cam against the inner surface of the tapered end 61 of the sleeve 60 and thereby grip a work piece, as for instance a drill bit 75, in a conventional manner.

The opposite end of the drill bit 75 may be centered and supported by a spring collet 80 disposed in a sleeve 81 which has an enlarged bearing portion 82 disposed for free axial movement within the sleeve 68. The collet 80 is normally retained in a gripping position with respect to the drill bit 75 by virtue of a coil spring 84 which acts between a collar 85 formed on the sleeve 81 and a headed portion 86 carried by a stem 87 which is rigidly associated with the spring collet fingers 80. The spring collet assembly is conventional and has as its chief function the support of the work piece during its introduction to the chuck jaw 72 from the right as viewed in Fig. 2.

As illustrated in Fig. 1 the entire work piece supporting means, designated 12 and comprising principally the chuck 47, the mounting block 44, the circular pivot plate 40 and the swinging base plate 30 are shown in such position that the axis of the chuck 47, and consequently of the drill bit 75, extends at an angle of 45° with respect to the peripheral face of the grinding wheel adjacent the point of contact of the frusto-conical point of the drill bit 75 therewith. This angular relationship is attained by swinging movement of the base plate 30 and all of the other parts of the work piece supporting means which are carried thereby on the pivot pin 31.

It will be noted that in the exemplary embodiment now being described the axis of the pivot pin extended is substantially tangent to the periphery of the grinding wheel 16, although variation of this relationship may be brought about by adjustment of either the grinding means 13 or the work holding means 12 or both. Adjusted pivotal position of the work holding means 12 about the pivot pin 31 may be maintained by a locking screw 90 threaded into the base plate 30 and adapted to engage, frictionally or otherwise, with the top of the surface plate 11 of the base 10. A knurled manipulating knob 91 for the screw 90 is shown in Fig. 2 and an extension 93 of the base plate 30 may carry the screw 90 and terminate outwardly in an indicating portion 94 for cooperation with a graduated quadrant plate 95 which may be secured directly to the surface plate 11 of the base 10. This adjustment, in the case of the grinding of the generally conical end of a twist drill determines the angle of the cutting lip with respect to the axis of the drill.

Means are provided whereby the chuck 47 and the mounting block 44 may be swung toward and away from the grinding wheel, for a purpose which will presently appear, without disturbing the primary adjustment of the angular relationship of the axis of the work as such angular relationship is defined by the adjusted swinging of the base plate 30 on the pivot pin 31. Such independent pivotal movement is attained by virtue of the circular plate 40 which is pivotally supported upon the base plate 30 by the pivot pin 36 and permits pivotal movement of the chuck 47 to a position where the point of the drill may be introduced to an aligning element shown at 98 in Fig. 1.

This aligning element 98 includes a pair of spaced pins 99 which are adapted to engage the opposed flutes of a drill bit and by such engagement insure that the angular disposition of the drill, with respect to its own axis, is such that its cutting lips extend horizontally. The pins 99 may be rigidly supported by a plug 100 disposed for axial sliding movement in the upper end of a post 101 secured to the base plate 30. The plug 101 has a reduced stem 102 extending rearwardly therefrom and terminating in a manipulating member 103. A compression coil spring 104 is disposed about the stem 102 and acts between the back of the plug 100 and a bracket 105 carried by the post 101 to urge the plug 100 and the guide pins 99 resiliently forwardly to the position illustrated. After the bit has been angularly aligned and secured in the jaws of the chuck 47 the guide pin 99 may be manually withdrawn against the resistance of the spring 104 to permit pivotal movement of the work piece to the grinding wheel 16 on the pivot pin 36. Pivotal movement of the chuck 47, the mounting block 44, and the plate 40 on the pivot pin 36 is limited by engagement of a pin 107, which is fixedly carried by the plate 40 in an arcuate slot 108 formed in the upper surface of the base plate 30. Engagement of the pin 107 against the ends of the slot 108 defines the limits of pivotal movement about the pivot pin 36.

Automatic means are provided for dressing the peripheral face of the grinding wheel 16 between grinding operations and such means include, in addition to the wheel dressing means proper, means for automatically feeding the grinding mechanism in a horizontal direction transverse to the axis of rotation of the wheel 16. To this end the intermediate plate 18 which supports the motor 15 and the grinding wheel 16 for movement thereon in the direction of the axis of rotation of the grinding means, is itself disposed upon the upper surface plate 11 of the base 10 for sliding movement in a direction transverse to the axis of rotation of the motor 15 and the grinding wheel 16. The intermediate plate 18 has rigidly associated therewith a block 110 which extends downwardly through an elongated slot 111 in the surface plate 11 and is internally threaded for cooperation with an adjusting screw 112. The adjusting screw 112 is journaled in a pair of bearing blocks 113 which are secured to the under side of the portion 11 of the base 10 and the adjusting screw 112 may be held against axial movement in any convenient manner.

Adjusting rotation of the screw 112 is accomplished by means of a drive comprising a worm wheel 114 which is fixed thereto, a worm 115 journaled in suitable bearings at the underside of the plate 11 and fixed for rotation with a ratchet wheel 117. Increments of rotation are imparted to the ratchet wheel 117 by a pawl 118 carried by a pawl arm 119, the latter being oscillated by alternate energization and de-energization of a solenoid 120. Return movement of the pawl arm 119 and the pawl 118 may be accomplished by a spring 121 upon de-energization of the solenoid 120. A link 122 connects pivotally between a movable core 123 of the solenoid 120 and the pawl arm 119.

The solenoid 120 appears in the wiring diagram, which is Fig. 7, and has an operating circuit 123 in parallel with the principal motor circuit. A cam 124 is fixed to the pivot pin 36 which pivotally associates the circular supporting plate 40 of the drill holding chuck 47 with the base plate 30. From this it will appear that each partial rotation of the circular plate 40, the mounting block 44 and the chuck to a position for aligning a drill bit by use of the gage 98, results in a partial rotation of the cam 124 to to close a micro-switch 125 in the circuit 123 and energize the solenoid 120.

The cam 124 is viewed from the bottom of the machine in Fig. 7 and in the position which it assumes when the chuck 47 is in the angular position illustrated in Fig. 1. The first part of the pivotal movement on the pivot pin 36 to bring the bit 75 to the gage 98 causes the first rise of the cam 124, designated 126, to close the switch 125. After closure of the micro-switch 125, continued rotation of the cam 124 during which time the drill bit completes its movement to the gage 98, results in the closure of a second micro-switch 127 and the resultant energization of a second solenoid 128 likewise arranged in shunt relation with principal motor circuit of the machine by a shunt circuit 129, the closure of the second switch 127 being effected by a further rise 130 on the cam 124. Such second solenoid 128 is shown in Figs. 2 and 5 as carried at the underside of the plate 11 by a bracket 131 which may be retained by the same nut 33 which secures the pivot pin 31 of the base plate 30.

The pivot pin 31 has its head 32 bifurcated to pivotally support an arm 132 which is provided at its outer end with a grinding wheel dressing tool, in the nature of a diamond or the like, 134. The wheel dressing tool 134 may be adjustably supported by a screw 135. It will be noted that the solenoid 128 has an armature or core 136 provided with a stem 137 which extends through the pivot pin 31 and is pivotally connected to the arm 132 eccentrically to the pivotal mounting thereof as at 138. A spring 139 is provided for normally, that is during periods of de-energization, urging the various movable elements of Fig. 5 to the position there shown.

Energization of the solenoid 128 exerts a downward pull upon the stem 137 and tends to oscillate the arm 132 in a manner intended to draw the tool 134 across the peripheral face of the grinding wheel 16 to dress the same.

Obviously the normal high-speed action of a solenoid would result in too rapid an oscillation of the arm 132 to adequately dress the periphery of the wheel. For this reason a dash pot 140 is preferably associated with the solenoid 128 to slow its action to a rate calculated to properly dress the periphery of the grinding wheel.

The dash pot 140, Fig. 5, may comprise a chamber filled with a fluid of proper viscosity and having therein a piston 141 operatively connected with the core or armature 136 by means of a stem 142. The piston, in Fig. 5 has a slow bleed hole 143 and a quick return check valve 144.

It will be noted that the degree or depth of dressing depends on the amount of transverse feed which has been imparted to the grinding apparatus by rotation of the screw 112 immediately prior to the dressing operation and that the two steps, advancement of the grinding wheel transversely of its axis and passage across its periphery of the dressing tool, are effected automatically and successively during movement of the chuck 47 to the gage 98 to properly align a bit or other work piece.

With the commencement of the actual bit or tool grinding operation, it is desired that axial disposition of the bit or work piece and movement thereof during grinding be accurately determined and controlled by the relative angular disposition of the bit with respect to its own axis. To this end cam means are provided for varying the axial disposition of the bit by and upon rotation thereof to change the immediate zone of angular contact of the point of the tool with the grinding wheel. Such cam means may comprise a readily removable and interchangeable face cam such as is indicated at 150 in Figs. 1 and 2. The general profile of the radial face of the cam 150 appears in Fig. 1 and a development of this profile, wherein the full 360° of its periphery is developed into a single plane to show its camming contour, is shown in the schematic view, Fig. 9.

The cam 150 may have an annular seat for engaging over and bearing upon a boss 151 formed on the mounting block 44 co-axially with the opening for receiving the sleeve 60 of the chucking means 47. Axial displacement of the cam 150, after it is in position, may be prevented by means of a screw 152 whose head 153 engages in a slot in the periphery of the cam 150, and to permit ready assembly such slot may be of the bayonet type so that removal of the cam 150 may be effected by a partial rotation whereby the head 153 of the screw 152 comes into registry with the entrance portion of the bayonet slot.

Accurate angular disposition of the cam 150 with respect to the mounting block 44 is brought about by engagement of a key portion 156 of a lever 157 in a peripheral opening in the cam 150. Lever 157 is pivotally supported between bearings 159 which may be integral with the mounting block 44 and the lever 157 has an oppositely extending arm 160 which pivotally engages the end of a second key 161.

Initial assembly of the cam 150 upon the mounting block 44 is accomplished with the lever 157 lifted to permit entry of the cam 150 beneath the key portion 156 of the lever 157. Such manipulation of the lever 157 may be facilitated by the provision of a knob or other handle means 166. At that time the other key 161 will be engaged in a lengthwise key seat 164 formed in the sleeve 60 of the chucking means 47. Engagement of the key 161 in the key seat 164 determines the angular disposition of the sleeve 60 and consequently of the entire chucking means 47, and in this way accurate initial disposition of a ball cam follower 170, which may form a part of the screw 70, is assured.

The flutes of the drill are engaged with the pins 99 of the gage 98 and the drill 75 is tightened in the jaws 72 of the chuck 47 with its cutting lips extending horizontally while the key 161 is engaged in the key set 164, whereby proper angular relationship between the cutting lips of the bit and the cam follower 170 is assured. After initial introduction of the cam 150 to the boss 151 and accurate securement of the bit or work piece in the chuck 47 the cam 150 is moved angularly until its peripheral opening registers with the key portion 156 of the lever 157, whereupon the latter is dropped to the position shown in Fig. 2.

The entire assembly comprising the bit 75, the chuck 47, the mounting block 44, and the circular plate 40 is now ready to be moved about the axis of the pivot pin 36 to present the bit to the grinding wheel. Preparatory to such movement the gage pins 99 are withdrawn to avoid interference with swinging movement of the end of the bit 75.

In this position of parts, as has been stated, the drill 75, for instance, is disposed with its cutting lips extending horizontally. With respect to a point grinding operation, this disposition of the drill bit 75 would constitute a position most remote from the surface of the grinding wheel 16, with respect to movement of the drill or bit along its axis toward and away from the grinding wheel. To put it another way, subsequent grinding of the lip clearance at points thereon other than the actual cutting lip would require movement of the drill bit toward the grinding wheel. Such movement is under the control of the cam 150 and is determined thereby.

It will be noted that clockwise rotation of the chuck 47 in its receiving opening in the mounting block 44 will result in the cam follower 170 riding down the incline of the profile of the cam 150 from the positions shown in Figs. 1 and 9. The angle of this incline on any particular cam is arranged to be suitable to the grinding of lip clearance of a particular angle and as many cams 150 may be provided as there are different lip clearance requirements, where the provision of lip clearance upon twist drills is the particular problem at hand.

It is sometimes desired, after an initial grinding to grind deeper along the lip clearance of a drill, usually because the first grind has not removed sufficient stock to complete the newly ground lip clearance surface. Means are provided so that an operator may, when this becomes necessary, release the mounting block 44 from its initially locked position with respect to the circular plate 40 for limited axial movement along the tongue and groove connection 50 between those two elements. Such release is effected by manual vertical movement of a stem 171 which has a manipulating portion 172 and a locking pin portion 173 which normally engages in coaxial openings in the upper surface of the circular plate 40 and the inner end of a pivotal arm 174.

The pivotal arm 174 has oppositely projecting pintles 175 which engage in opposed bearings formed in an upward extension of the circular plate 40 and a cooperating cover plate 177. A spring 178 normally urges the pin 172 into locking position. Release of the pin 173 from engagement with the opening of the circular plate 40 permits pivotal movement of the arm 174 upon its pintles 175 and upon such movement a lateral extension 180 of the arm 174 engages the opposite side walls of an opening 181 formed in the side of the mounting block 44. The opening 181 is shown in Fig. 4 as having substantial vertical clearance with respect to the lateral projection 180 but is accurately fitted to such extension in a horizontal direction. For this reason accurate axial adjustment of the mounting block 44 on the circular plate 40 may be effected by pivotal manipulation of the arm 174.

In the form thus far described reference has been had chiefly to the use of the novel machine of my invention in the operation of grinding the drilling points of conventional drill bits. It is my invention that this machine be an all-purpose apparatus for operations of this general nature and, as is clear from the foregoing description, the particular chucking means 47 and associated control cam 150 is readily removable and replaceable by other kinds of chucks for holding other kinds and sizes of bits, other machine tool cutters, or analogous work pieces, and suitable control cams therefor.

Figure 12:
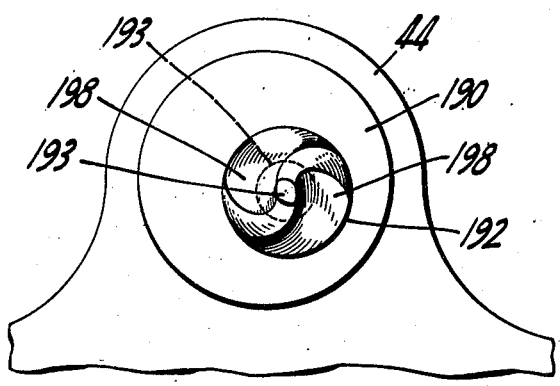

By the substitution of suitably modified chucks and control cams, the machine thus far set forth serves in carrying out a novel method of producing a novel countersinking bit of my invention, and reference is had to Figs. 12 through 14 wherein such bit and the modified chucking and cam control elements employed in producing the bit in the machine of my invention are shown.

Stated generally, the novel countersinking bit of my invention is such that the pair of cutting lips thereof lie wholly in a frusto-conical surface of revolution. This much, of course, is true of the cutting lips of conventional drill bits and conventional countersinking tools. The disposition of the cutting lips of the bit of the present invention is novel, however, in the fact that they extend in a receding helical or spiral line along such conical surface of revolution, beginning at their inner extremities and receding gradually and substantially uniformly in such manner that a very substantial included angle is defined by lines radiating from the center of the bit and extending, respectively, through the beginning and end of each cutting lip (the end being at the outer diameter of the bit).

As appears from a consideration of Fig. 12, the cutting lip thus formed has a scimitar-like cutting edge which results in a pronounced shearing action in the removal of metal or the like when the countersinking bit is performing its intended operation. This countersinking bit has been found to be vastly superior in ease of operation, quality of work produced, and tool life, as compared with conventional countersinking bits.

Figure 10:
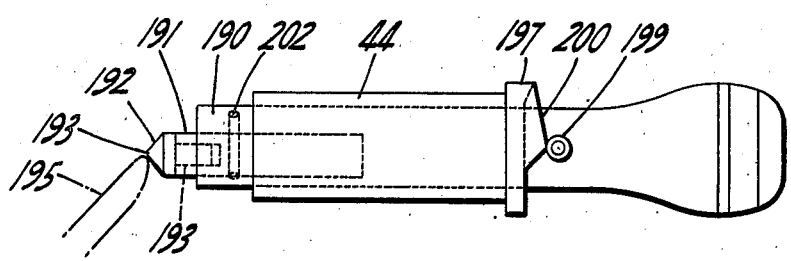
Fig. 10 is a fragmentary plan view of the chuck portion of the machine of my invention with a modified cam element and bit supporting means, for operating upon the novel bit element of my invention.

Referring to Fig. 10, mounting block 44 of the previously described machine is shown fitted with a chuck 190 which comprises merely a round bar adapted to accurately fit the axial opening which, in the previously described modification, received the chuck 47. Such bar is provided with an eccentric opening adapted to receive a bit supporting element 191 and the bit blank to be operated upon to produce the novel countersinking bit of my invention is shown in Fig. 10 at 192. Such bit blank 192 may have a threaded shank 193 for being screwed into the end of the element 191.

In Fig. 10 a grinding wheel is schematically indicated in dot-and-dash lines at 195, and the periphery of such grinding wheel is shaped approximately as there shown. A special cam 197 is provided for the operation which is intended to be performed with the arrangement of Fig. 10. This operation comprises the production of helical or spiral flutes in the conical face of the bit blank 192.

As originally formed, the bit blank 192 is provided with a small, flat, circular end 193. The flute to be formed in the frusto-conical face of the bit blank 192 is slightly undercut whereby the angle of rake presented to the work is somewhat less than in conventional drilling operations. Such under-cutting is provided by forming the periphery of the grinding wheel 195 with a much less radius of curvature at one side than at the other, all as shown in Fig. 10, together, of course, with a suitable adjustment of the angular disposition of the axis of the bit blank with respect to the axis of rotation of the grinding wheel 195.

From the position there shown the operator, in producing one of the flutes designated 198 in Fig. 12, manually rotates the chuck 190 in a direction which is clockwise as viewed from the right in Fig. 10, or counterclockwise as viewed in Fig. 12. Such rotation causes a cam follower 199, carried by the chuck 190, to ride down the incline 200 of the face cam 197. It will be seen that this action moves the chuck 190 and consequently the bit blank 192 axially toward the grinding wheel.

This movement is in fixed relation with respect to angular manual movement of the chuck 190 and is accompanied by a movement of the bit blank 192 away from the periphery of the grinding wheel 195 in a direction at right angles to the axis of the bit blank. This latter movement comes as a result of the eccentric disposition of the bit blank 192 with respect to the axis of rotation of the chuck 190, and is likewise in fixed relation with respect to manual rotation of the chuck 190.

The cam 197, with its follower 199, and the eccentric disposition of the bit blank 192, cooperate to present the frusto-conical surface of the bit blank 192 to the periphery of the grinding wheel 195 in such manner as to progressively produce a flute of conical, spiral form, as shown in Fig. 12, beginning at the central flat face 193 of the bit blank 192 and terminating at the outer diameter thereof.

After one such flute has been formed, a pin 202, which extends through the chuck 190 and the element 191 to normally prevent relative rotation therebetween, is removed and the element 191 with the bit blank 192 is rotated through 180°, whereupon the pin 202 is replaced and the parts are in position to produce a second flute 198 spaced 180° from the already formed flute.

Subsequent to the production of the two flutes 198 the remaining unground surface of the frusto-conical portion of the bit blank 192 is provided with lip clearance in a manner which is substantially the same in principle as that which was described in connection with the grinding of lip clearance on conventional drill bits hereinbefore. The lip clearance of the countersinking bit of my invention is preferably somewhat less than in standard drill grinding practice. This is more than counteracted by the substantially less angle of rake provided in producing the flutes 198.

Because of the disposition of each cutting lip of the countersinking bit of my invention, wherein such cutting lip recedes spirally around the conical surface of revolution in which it lies in its extent from the center to the outside of the bit, grinding the lip clearance in the manner described in connection with conventional drill bits results in a greater grinding off of the cutting lip as the outside of the tool is approached.

For this reason grinding the lip clearance of the tool decreases the included angle of the cutting lips of the bit as compared with the apex angle of the original frusto-conical surface of revolution of the bit blank 192. This reduction of the included angle of the cutting lip may be anticipated in the original formation of the frusto-conical surface of the bit blank 192; that is, that angle may be made larger than the intended ultimate angle formed by the cutting lips of the finished countersinking bit.

Figure 11:
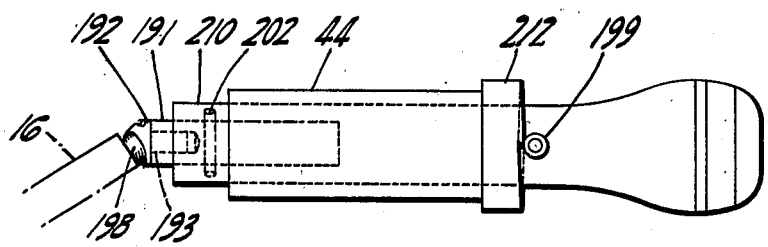
Fig. 11 is a further modified chuck and cam control element therefor for performing another operation in the fabrication of the novel bit of my invention; and, Fig. 12 is an end elevational view of the chuck of Fig. 10 with the novel bit of my invention held therein and viewed from its work contacting end.

Fig. 11 illustrates a suitable chuck 210 for receiving the bit supporting element 191 of Fig. 10, the bit blank being still disposed therein as at 192. In the case of Fig. 11, however, wherein the object is to provide lip clearance for the bit, the disposition of the supporting element 191 and the bit blank 192 is concentric with respect to the axis of revolution of the chuck 210. A suitable cam 212 is provided which is the same in principle as the cam 150 of the conventional drill bit grinding apparatus being modified only with respect to the relatively less angle of lip clearance which it is intended to provide. Both lip clearances of the bit blank 192 may be ground in a single revolution of the chuck 210, as in the case of grinding the lip clearances of conventional drill bits, by virtue of the fact that the cam 212 has two lip grinding inclines as in the case of the cam 150, whose contour is illustrated schematically in Fig. 9.

What is claimed is:

1. In a grinding machine, a base and a rotatable abrading implement carried thereby, supporting means likewise carried by said base and work holding means projecting from opposite ends thereof and journaled therein, one end of said holding means comprising a chuck for receiving a work piece and the other end of said holding means comprising a portion for manual manipulation, a cam secured to one of said means and a follower therefor on the other of said means, whereby the relative axial position of the holding means in the supporting means is automatically varied in response to manual rotation thereof, gage means carried by said base for engagement with the end of a work piece to be operated upon to align the same angularly on its own axis, said gage means being spaced from said abrading implement, and means providing pivotal movement of said work holding means whereby a work piece may be pivotally moved between said gage means and said abrading implement.

2. In a grinding machine, a rotatable abrading implement having a peripheral grinding face, rotatable work holding means, means for supporting said abrading implement and said work holding means with their axes in a common plane, said work holding means having a movable connection with said supporting means whereby it may be moved to and from operative position with respect to the abrading implement between abrading operations, automatic means for dressing the peripheral grinding face of said abrading implement between successive abrading operations and means for advancing the abrading implement toward the dressing means between abrading operations to compensate for the portion of the abrading implement removed during a dressing operation, said dressing means and said advancing means being actuable by and upon movement of said work holding means from operative position with respect to the abrading implement.

3. In a drill bit lip clearance grinding machine having a relatively fixed horizontally extending abrading line, an abrading wheel having a horizontal axis of rotation parallel to said line, means supporting said wheel for horizontal adjusting movement perpendicular to said axis and said line, wheel dressing means having a working face movable along said line to traverse the periphery of said wheel and dress it to coincidence with said line, means supporting a drill bit on an axis in the same horizontal plane as the axis of said wheel, said drill supporting means being pivoted on a vertical axis tangent to the periphery of said wheel, means for locking said supporting means in adjusted angular position on said pivot axis, means for automatically adjusting said wheel toward said abrading line and means for successively moving said dressing means along said line for dressing the periphery of said wheel between successive drill bit lip clearance grinding operations.

ARTHUR A. SCHWARTZ.